US008918675B2

(12) United States Patent
Buban et al.

(10) Patent No.: US 8,918,675 B2
(45) Date of Patent: Dec. 23, 2014

(54) RECTIFYING CORRUPT SEQUENCE VALUES IN DISTRIBUTED SYSTEMS

(75) Inventors: Garret J. Buban, Carnation, WA (US); Ritesh Kumar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 432 days.

(21) Appl. No.: 13/329,470

(22) Filed: Dec. 19, 2011

(65) Prior Publication Data

US 2013/0159769 A1 Jun. 20, 2013

(51) Int. Cl.
*G06F 11/00* (2006.01)

(52) U.S. Cl.
USPC .................................. 714/21; 714/15; 714/18

(58) Field of Classification Search
CPC . H04L 67/1095; H04L 12/1827; H04L 47/34; G06F 17/30067; G06F 1/14
See application file for complete search history.

(56) References Cited

U.S. PATENT DOCUMENTS

| | | | | |
|---|---|---|---|---|
| 5,255,268 A * | 10/1993 | Cato et al. | | 370/405 |
| 5,619,644 A | 4/1997 | Crockett et al. | | |
| 5,907,685 A | 5/1999 | Douceur | | |
| 6,157,957 A | 12/2000 | Berthaud | | |
| 6,978,384 B1 * | 12/2005 | Milliken | | 726/26 |
| 7,020,796 B1 * | 3/2006 | Ennis et al. | | 714/4.1 |
| 7,146,366 B2 | 12/2006 | Hinshaw et al. | | |
| 7,716,180 B2 | 5/2010 | Vermeulen et al. | | |
| 2003/0233594 A1 | 12/2003 | Earl | | |
| 2004/0078637 A1 * | 4/2004 | Fellin et al. | | 714/6 |
| 2005/0081080 A1 * | 4/2005 | Bender et al. | | 714/2 |
| 2007/0140153 A1 * | 6/2007 | Kono | | 370/311 |
| 2007/0168785 A1 * | 7/2007 | Cohn | | 714/724 |
| 2008/0072221 A1 | 3/2008 | Chkodrov et al. | | |
| 2009/0193094 A1 | 7/2009 | Scholl et al. | | |
| 2010/0014444 A1 * | 1/2010 | Ghanadan et al. | | 370/310 |
| 2010/0042883 A1 * | 2/2010 | Heise | | 714/748 |
| 2010/0185781 A1 | 7/2010 | Anderson | | |

OTHER PUBLICATIONS

Notification of Transmittal of the International Search Report and the Written Opinion of the International Searching Authority, or the Declaration in PCT/US2012/068842 mailed Mar. 27, 2013, 8 pages.
Chang, et al., "Bigtable: A Distributed Storage System for Structured Data", In Journal ACM Transactions on Computer Systems (TOCS), vol. 26, Issue 2, Jun. 2008, 14 pages.
Kronenberg, et al., "VAXcluster: A Closely-coupled Distributed System", In Journal ACM Transactions on Computer Systems (TOCS), vol. 4, Issue 2, May 1986, pp. 130-146.

(Continued)

*Primary Examiner* — Scott Baderman
*Assistant Examiner* — Jason Bryan
(74) *Attorney, Agent, or Firm* — Ben Tabor; Raghu Chinagudabha; Micky Minhas

(57) ABSTRACT

Embodiments of the present invention relate to detecting and rectifying corruption in a distributed clock in a distributed system. Aspects may include receiving a sequence number used as part of the distributed clock at a node and determining if the sequence number is corrupt. In order to provide an effective mechanism for determining a sequence number is corrupt and taking corrective actions, a valid sequence number range may be determined, a propagation count associated with the sequence number may be evaluated, an estimated sequence number may be calculated, and an epoch number associated with the sequence number may be evaluated. Additionally, in exemplary aspects node with a corrupt trusted sequence values may self diagnosis and terminate associated processes to prevent further propagation of the corrupt sequence number.

20 Claims, 11 Drawing Sheets

(56) References Cited

OTHER PUBLICATIONS

Strom, et al., "Optimistic Recovery in Distributed Systems", In Journal ACM Transactions on Computer Systems (TOCS), vol. 3, Issue 3, Aug. 1985, pp. 204-226.

Moser, et al., "Totem: A Fault-tolerant Multicast Group Communication System", In Magazine Communications of the ACM, vol. 39, Issue 4, Apr. 1996, pp. 54-63.

Lamport, "Time, Clocks, and the Ordering of Events in a Distributed System", In Communications of the ACM vol. 21, Issue 7, Jul. 1978, pp. 558-565.

* cited by examiner

RECTIFYING CORRUPT SEQUENCE VALUES IN DISTRIBUTED SYSTEMS

BACKGROUND

In a distributed system it is traditionally difficult to rely on a temporal clock to identify an order in which events occur. Therefore, it is difficult to identify which events occurred before other events. This is in part because of the rate at which events occur, the discrepancies in internal physical clocks, and inherent latencies within distributed systems. As a result, a concept of ordering events based on a logical clock has evolved to solve synchronization issues in a distributed system. A seminal discussion on the concept may be found at *Time, Clocks, and the Ordering of Events in a Distributed System*, Leslie Lamport, *Communications of the ACM*, July 1978, vol. 1, no. 7, 558-565. However, values used in the logical clock, such as a sequence number, may become corrupt and prevent the effective scalability and load distribution of the distributed system.

SUMMARY

Embodiments of the present invention relate to systems, methods, and computer storage media for detecting and/or rectifying corrupt sequence values in a distributed computing system. Detection and/or rectification of corruption may include receiving a sequence number at a node of the system and determining if the sequence number is corrupt. In order to provide an effective mechanism for determining a sequence number is corrupt, a valid sequence number range may be determined, a propagation count associated with the sequence number may be evaluated, an estimated sequence number may be calculated, and an epoch number associated with the sequence number may be evaluated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
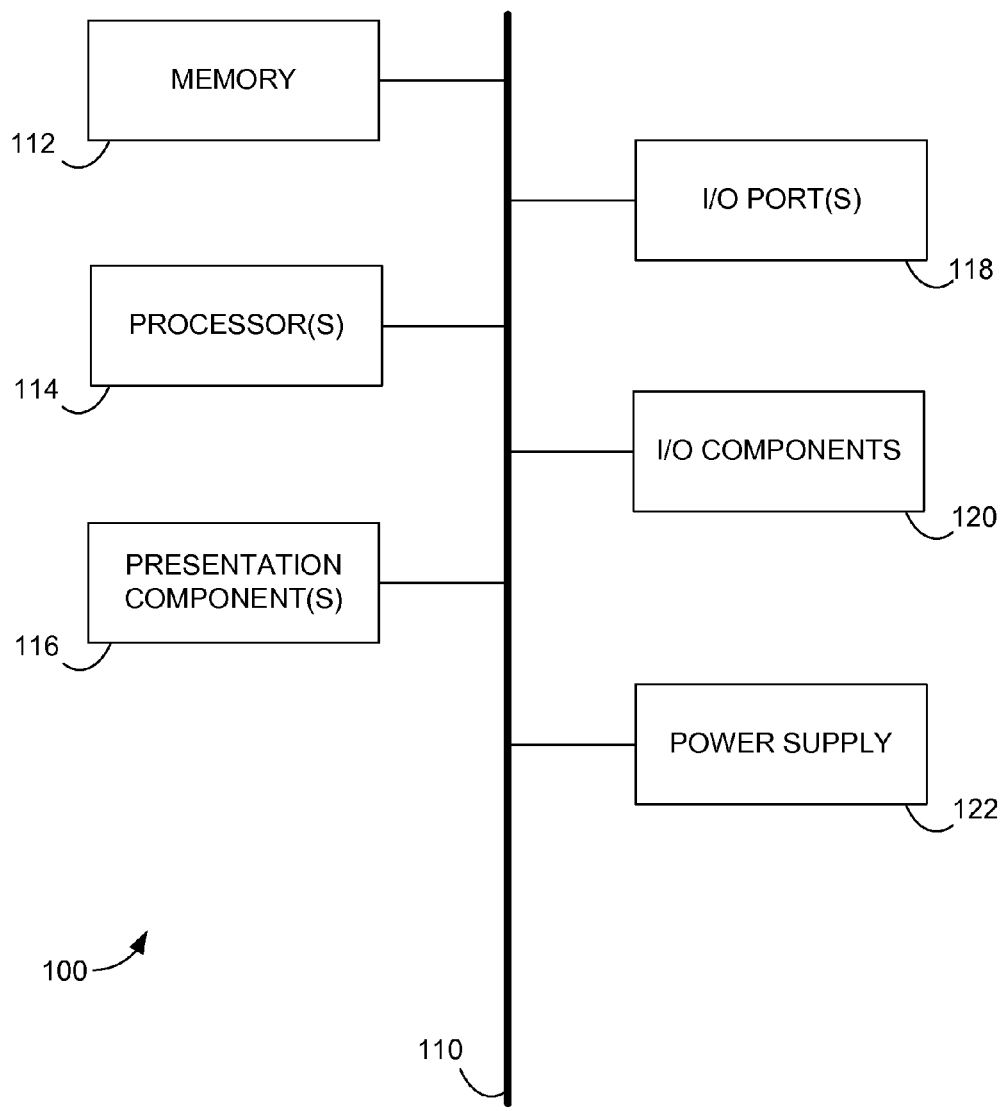
FIG. 1 depicts an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods, and computer storage media for detecting and/or rectifying corrupt sequence values in a distributed computing system. Detection and/or rectification of corruption may include receiving a sequence number at a node of the system and determining if the sequence number is corrupt. In order to provide an effective mechanism for determining a sequence number is corrupt, a valid sequence number range may be determined, a propagation count associated with the sequence number may be evaluated, an estimated sequence number may be calculated, and an epoch number associated with the sequence number may be evaluated.

Accordingly, in one aspect, the present invention provides a method for detecting and/or rectifying corrupt sequence numbering in a distributed clock system of a distributed computing environment. The method is comprised of receiving, at a first node within the distributed computing environment, a first sequence number from a second node. The method also includes determining, with a processor, the first sequence number is greater than a stored sequence number. Further, the method includes determining a propagation number associate with the first sequence number is less than a predefined maximum propagation number. The method includes determining the first sequence number is within a valid sequence number range. The method also includes updating the stored sequence number to represent the first sequence number.

In another aspect, the present invention provides computer storage media having computer-executable instructions embodied thereon, that when executed by a computing system having a processor and memory, cause the computing system to perform a method for rectifying corrupt sequence numbering in a distributed clock system of a distributed computing environment. The method includes receiving, at a first node within the distributed computing environment, a first sequence number from a second node. The method also includes receiving a peak rate of a primary controller. Further, it is contemplated that the method includes determining, with the processor, the first sequence number is not within a valid sequence number range. The method may additionally include estimating, based in part on the peak rate, a sequence number. The estimated sequence number is greater than the stored sequence number, in this example.

A third aspect of the present invention provides a system for rectifying corrupt sequence numbering in a distributed clock system of a distributed computing environment. The system comprises a primary controller of the distributed clock system, wherein a communication from the primary controller to one or more nodes of the distributed computing environment includes a sequence number, an epoch number, a peak rate, and an epoch number check. The system is further comprised of a secondary controller of the distributed clock system, wherein the secondary controller updates a sequence of numbers at a first node of the distributed computing system when a sequence number associated with the secondary controller is greater than a first sequence number received from the first node. Further, communications from the first node include the first sequence number. The system is comprised of a second node of the distributed computing environment, wherein communications from the second node include a second sequence number, the second sequence number is an estimated sequence number calculated, in part, based on the peak rate from the primary controller.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, distributed computing configurations, etc. Embodiments may also be practiced in distributed computing environments where tasks are performed by remote-processing devices that are linked through a communications network, such as the Internet.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes non-transitory computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, depth camera, gesture sensors, and the like.

Figure 2:
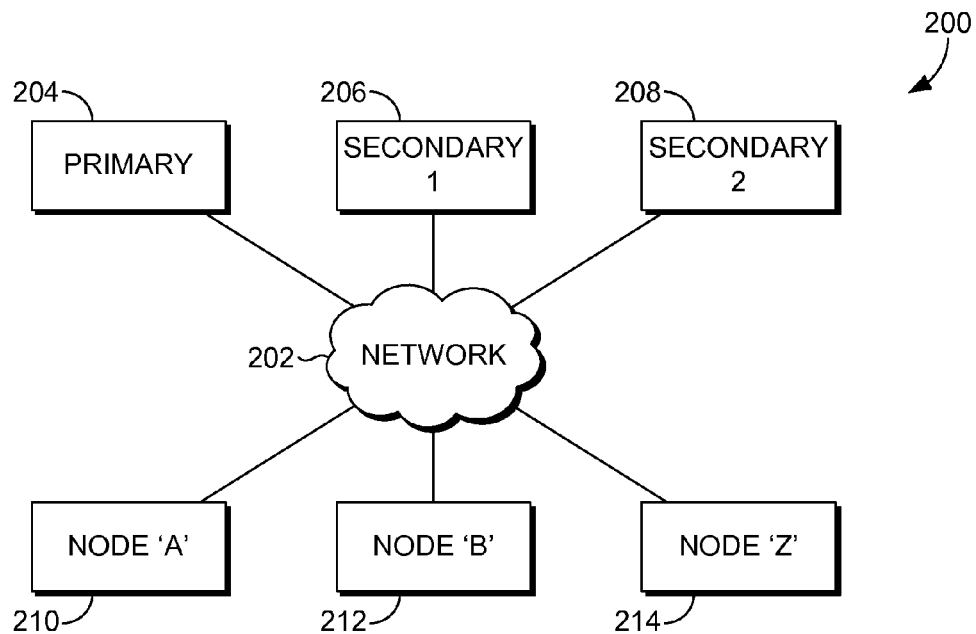
FIG. 2 depicts a block diagram illustrating an exemplary system in which embodiments of the present invention may be employed.

With reference to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and grouping of functions, etc.) can be used in addition to or instead of those shown, and some elements may be omitted altogether. Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a primary controller 204, a secondary A controller 206, a secondary B controller 208, a node A 210, a node B 212, and a node Z 214. Each of the components shown in FIG.

2 may be any type of computing device, such as computing device 100 described with reference to FIG. 1, for example. The components may communicate with each other via a network 202, which may include, without limitation, one or more local area networks (LANs) and/or wide area networks (WANs). Such networking environments are commonplace in offices, enterprise-wide computer networks, intranets, and the Internet. It should be understood that any number of primary controllers, secondary controllers, nodes, computing devices, and networks may be employed within the system 200 within the scope of the present invention. Additionally other component not shown may also be included within the system 200.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting.

A distributed computing system, such as Azure by the Microsoft Corporation of Redmond, Wash., may use a distributed clock to order events within the system. A primary controller, such as the primary controller 204 (hereinafter may be referred to as a "Primary"), may be responsible, in part for incrementing a sequence number whenever a modification to its data or state occurs. The primary controller may be responsible for maintaining all meta-state for the system. Therefore, when the state of the system changes, the primary increments (e.g., by one) the sequence number. These sequence numbers, which may be combined with an epoch number and a propagation count in some aspects, may be exchanged between nodes (e.g., clients) to ensure each of the nodes is aware of relevant changes that occurred to the system before a given point in time. The general concept of a distributed clock utilizing sequence numbers is generally known by those with ordinary skill in the art and is discussed at greater detail in *Time, Clocks, and the Ordering of Events in a Distributed System*, Leslie Lamport, *Communications of the ACM*, July 1978, vol. 1, no. 7, 558-565, which is incorporated by reference herein in its entirety.

The use of a distributed clock allows for, among other advantages, a system that is capable of using a secondary controller, such as the secondary A controller 206 and the secondary B controller 208, to process requests (e.g., read requests). A secondary controller is a secondary instance of the primary controller. The secondary controller may process requests from a node provided that the secondary controller is at a state at least as current as a sequence number associated with the requesting node. If a requesting node is associated with a sequence number greater than a sequence number through which the secondary controller has processed, the requesting node may then revert to the primary controller for processing of the request or wait until the secondary controller is current through the requesting node's sequence number. By utilizing a secondary controller, the system is functional to scale and distribute computing load without relying on the primary controller alone.

Nodes in a distributed computing environment may share their sequence number with other nodes and controllers to which they communicate by inter-system messages. A node's sequence number represents a system state under which the node is operating. In this regard, there may be a "real" sequence number. A real sequence number, in an exemplary aspect, is the largest sequence number received at the node that is within a valid sequence number range that also has a propagation count less than a predefined maximum, which will be discussed in greater detail hereinafter. Another sequence number that may be communicated by a node is an estimated sequence number. An estimated sequence number, in an exemplary aspect, is an estimated intentionally high sequence number that is used when a received sequence number is suspected of being corrupt, stale, or otherwise invalid. The estimated sequence value will be discussed in greater detail hereinafter.

In some instances, a node may communicate a real sequence number or it may communicate an estimated sequence number. Those situations in which an estimated sequence number is communicated may include when a suspected corrupt sequence number is received by the node, when a predefined time elapses, when a propagation number is above a predefined number, and the like. It is understood that additional or fewer scenarios may be implemented in which an estimated sequence number is communicated from a node rather than a real sequence number.

The communicating of sequence numbers by nodes, in an exemplary aspect, allows a receiving node to ensure that the receiving node is aware of what may be a newer state of the system than the receiving node was operating under. While earlier solutions may have relied on all nodes communicating back with a primary controller to receive updates as to when a sequence number is changed, this approach may not lend itself to scaling as all nodes become dependent on a single entity, the primary controller. Therefore, by allowing a gossip-like distribution of sequence numbers to be implemented, the nodes may instead also utilize the secondary controller instances for satisfying requests that would otherwise have been the exclusive domain of a primary controller.

Figure 4:
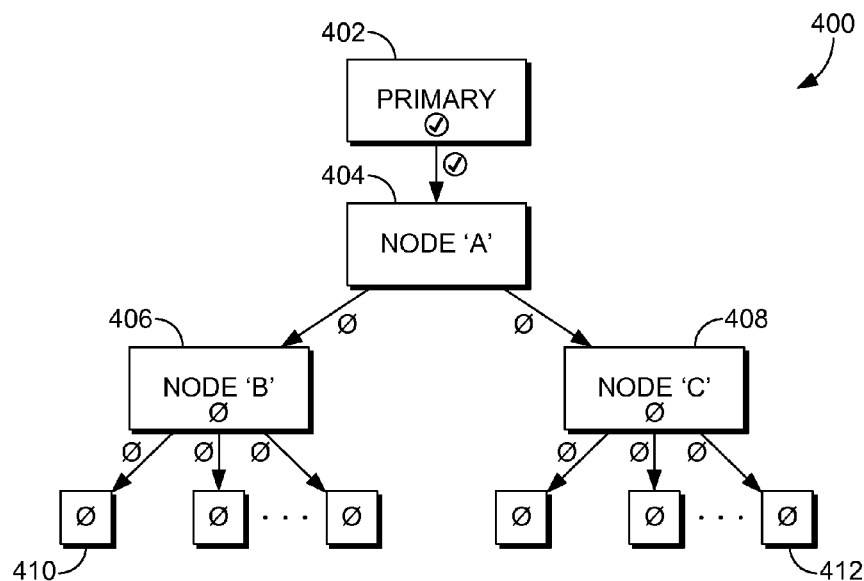
FIG. 4 depicts an exemplary scenario where a corrupt value is propagated through in-band communications among nodes in a distributed system, in accordance with aspects of the present invention.

By including a sequence number in communications between nodes (as opposed to only in communications between a primary and a node), there is a possibility that a corrupt sequence number (and/or other value) may be propagated throughout the system, as depicted in FIG. 4. FIG. 4 depicts an exemplary scenario where a corrupt value is propagated through in-band communications among nodes in a distributed system 400, in accordance with aspects of the present invention. If mechanisms were not implemented to prevent the gossip-like propagation of corrupt (e.g., invalid) sequence numbers, then the results depicted in FIG. 4 may occur.

For example, in FIG. 4 a primary (i.e., primary controller) 402 communicates a valid sequence number to a node A 404, as depicted by the circle with a check mark passing from the primary 402 to the node A 404. However, in this example, the sequence number becomes corrupted either at the node A 404 or during communication to both a node B 406 and a node C 408, as depicted by the null symbols. Because a mechanism is not in place at the node B 406 or the node C 408, the corrupt sequence numbers are allowed to continue to pass to other nodes, such as a node 410 and a node 412.

As a reminder, a node traditionally replaces a stored sequence number with a sequence number that is received that is greater than the stored sequence number. Therefore, if the corrupt sequence number emanating from the node A 404 was smaller (e.g., 5) than the stored sequence number (e.g., 999) at node B 406, the corrupted sequence number may not be passed along to the node 410. But, in an exemplary aspect, even though the smaller sequence number may not be propagated, the system may still be adversely affected. For example, the primary controller may send a sequence value of 1,000, but the node A corrupts the sequence number and sends a value of 5. In this example, node B may have a sequence value of 999 stored. Node B, under the contemplated method, may then ignore the received sequence value of 5 and would refrain from propagating the sequence number of 5, but node B would still have a stale view of the state of the system. Node B would still have a view of the system at 999, instead of the state of the system at 1,000, as indicated by the primary controller. In an exemplary aspect, node B may attempt at rectifying receiving an invalid sequence number by estimating a sequence value, such as 1,001. Because a node, in an exemplary aspect, communicates the higher of an estimated sequence number and a real sequence number, the node B would then propagate the estimated sequence number of 1,001, which is greater than the value of 999 that is the stored real sequence number at node B.

However, if the corrupt sequence number was larger (e.g., 1,050) than the stored sequence number (e.g., 999), then the corrupt sequence number may be passed to the node 410, in this example. Further, depending on the activity within the system, a corrupt sequence number may only be within the system for a limited period of time until the state of the system changes enough times such that the primary controller advances the real sequence number to a value greater than the corrupt sequence number. While this may be a self-correcting corruption when the difference between the stored sequence number and the corrupt sequence number is relatively small, when the difference is significantly large a self correction within the life of the system may not be practical. Therefore, aspects of the present invention introduce mechanism to limit the propagation (e.g., spreading) of suspected corrupt values as well as mechanisms for correcting those nodes maintaining the corrupt sequence numbers.

Figure 5:
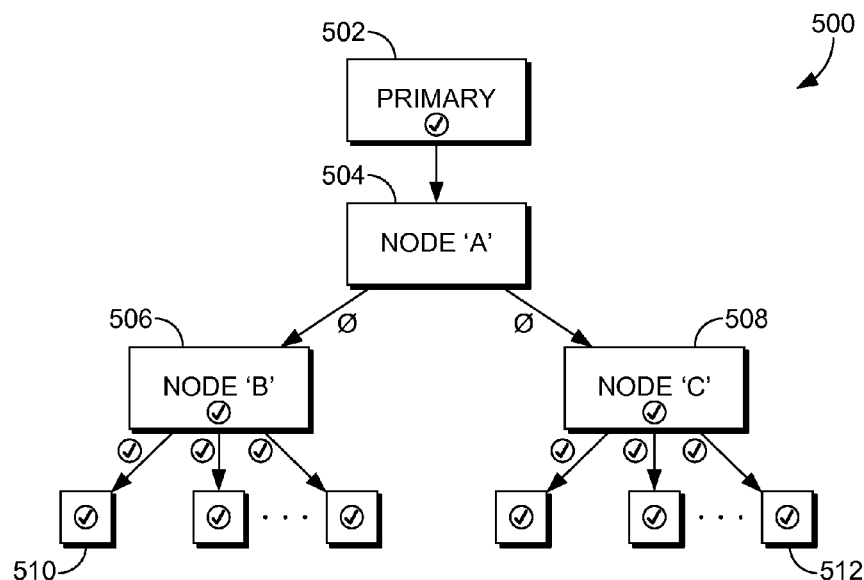
FIG. 5 depicts an exemplary scenario where a corrupt value is initially propagated through in-band communications among nodes in a distributed system, but inventive mechanisms prevent the further distribution of the corrupt sequence values, in accordance with aspects of the present invention.

For example, FIG. 5 depicts an exemplary scenario where a corrupt value is initially propagated through in-band communications among nodes in a distributed system 500, but mechanisms prevent the further distribution of the corrupt sequence values, in accordance with aspects of the present invention. FIG. 5 is comprised of a primary 502 that communicates a real (e.g., proper) sequence number to a node A 504. Similar to FIG. 4 above, node A 504 communicates a corrupt sequence number to a node B 506 and a node C 508, as depicted by the null symbol. However, unlike the example of FIG. 4, the node B 506 and the node C 508 identify the possibility of a corrupt sequence number as received from node A 504. Instead of distributing the corrupt sequence number, the node B 506 and the node C 508 communicate a real sequence number or an estimated sequence number. As a result, a node 510 and a node 512 receive either the real sequence number or the estimated sequence number.

Figure 3:
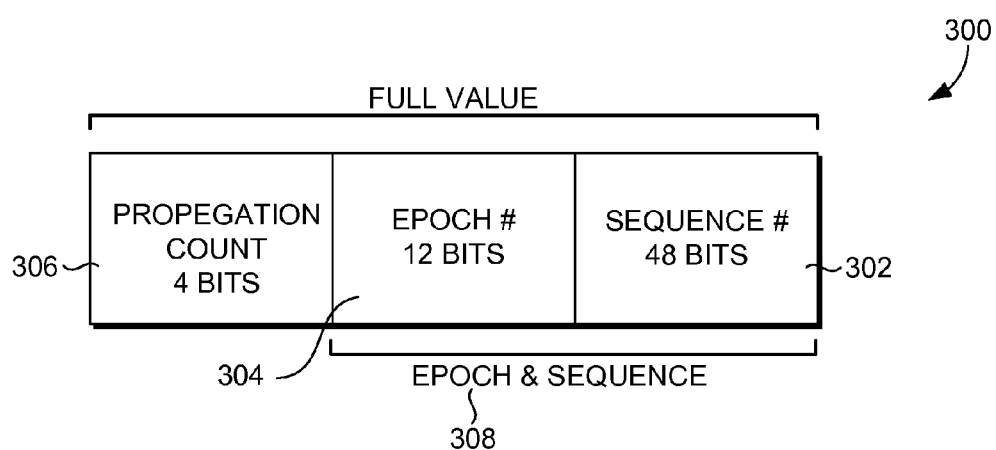
FIG. 3 depicts a full value that may be communicated as part of the distributed clock, in accordance with aspects of the present invention.

FIG. 3 depicts a full value 300 that may be communicated as part of the distributed clock, in accordance with aspects of the present invention. The full value 300 may consist of 64 bits of information that is associated with all communication from nodes. However, it is contemplated that the full value may be larger or smaller and that the full value may not be associated with all communications from a given node. The full value 300 is comprised of a sequence number 302, which may utilize 48 bits of the 64 bits. The full value 300 is further comprised of an epoch number 304, which may utilize 12 bits. And, the full value 300 may also be comprised of a propagation count, which may utilize 4 bits. While an exemplary aspect is presented in connection with FIG. 3, it is contemplated that any number of bits may be used for any portion of the full value. Further, it is contemplated that the full value as a whole may be any number of bits.

As previously discussed, the sequence number 302 is an ever increasing value that increments upward with each change to the system's state, in an exemplary aspect. Because the sequence number is generally only increasing, if a roll back is needed to a previous state, a lower sequence number cannot be introduced into the system. Therefore, the epoch number 304 is provided. If the sequence number is needed to start anew, the epoch number 304 is incremented forward by a predefined value (e.g., one) and the sequence number 302 is reset to an initial value. As will be discussed hereinafter, the resetting of a sequence number to a smaller value requires an additional mechanism to handle this intentional deviation from the concept that a sequence number is ever increasing. Because, in this example, the epoch number 304 is changed at a slower rate (if at all) than the sequence number 302, a smaller bit footprint is allocated, in this example.

The propagation count 306 may be a value that is incremented with each communication of an epoch and sequence pair 308. For example, a first communication from a first node to a second node may cause the propagation count to be incremented to one. A second communication from the second node to a third node may cause the propagation count to be incremented by one to two. And the process may continue. However, it is contemplated, as will be discussed in more detail hereinafter, that the propagation count 306 has a threshold limit that once the propagation count meets that value, the epoch and sequence pair 308 are deemed to be dated or stale. In combination, the sequence number, the epoch number, and the propagation number may form a foundation tool onto which the distributed clock operates while minimizing propagation of a corrupt sequence value, in an exemplary aspect.

Figure 6:
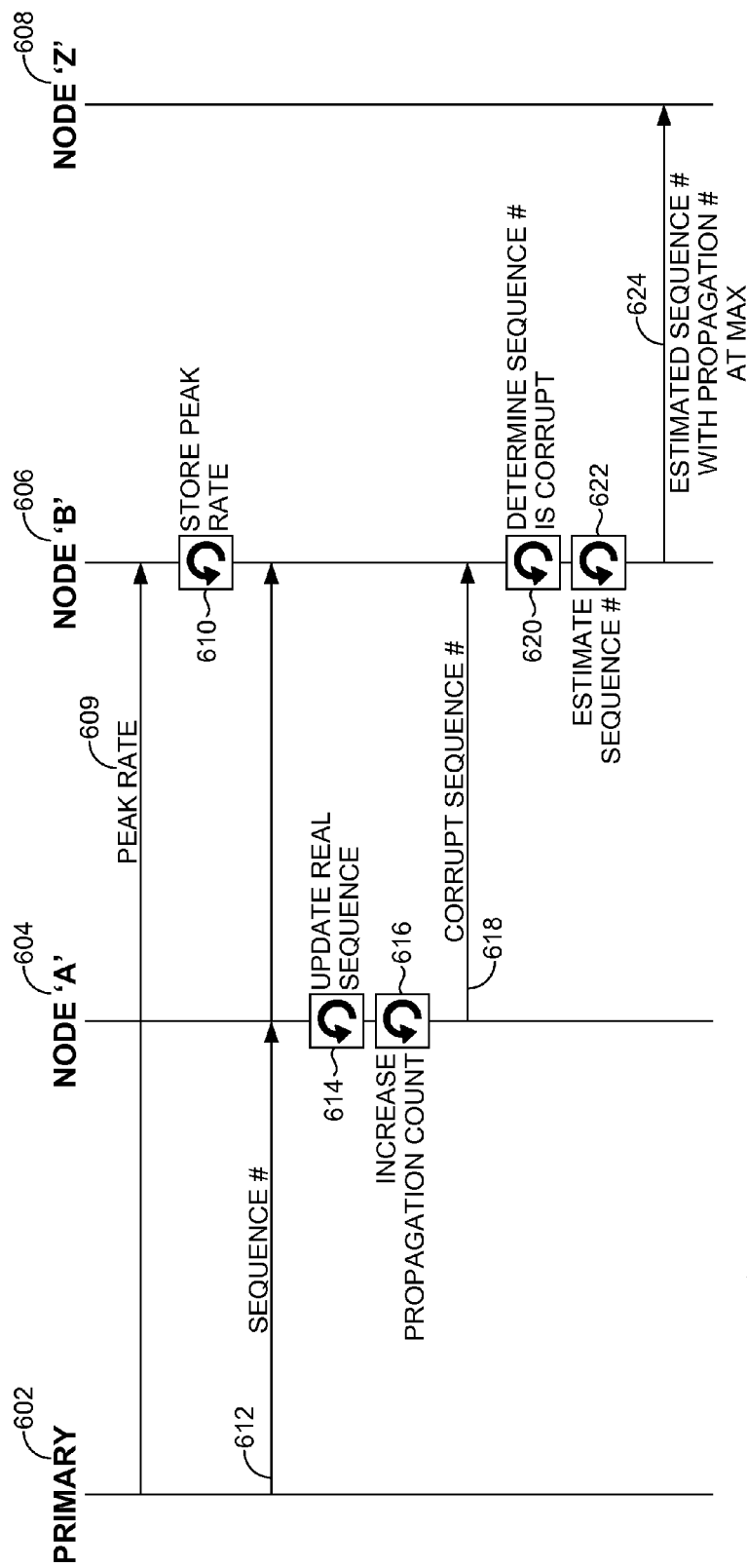
FIG. 6 depicts a communication diagram in an exemplary distributed computing environment for rectifying a corrupt sequence number, in accordance with aspects of the present invention.

FIG. 6 depicts a communication diagram 600 in an exemplary distributed computing environment for rectifying a corrupt sequence number, in accordance with aspects of the present invention. Communication is depicted as flowing among a primary 602, a node A 604, a node B 606, and a node Z 608. However, it is understood that additional components and/or fewer components may be implemented.

The primary 602 may communicate a peak rate 609 to one or more nodes, such as the node B 606. A peak rate is a dynamic value that may represent the highest sequence number change at the primary for a given period of time. For example, the peak rate may be the highest number of sequence number changes that occurred during a one second interval during a previous minute span. It is understood that any interval and span may be used. The peak rate, in an exemplary aspect, is utilized in calculating a valid sequence number range when verifying a received sequence number as being valid. The peak rate may also be utilized, in an exemplary aspect, for calculating, at least in part, an estimated sequence number. The peak rate allows for a dynamic mechanism to be implemented that is not limited to a hard-coded value for determining the valid sequence number range and/ or the estimated sequence number.

For example, a first system may have a peak rate of ten sequence number changes per second while a second system may have a peak rate of ten-thousand sequence number changes per second. The one-thousand order of magnitude difference highlights why, in an exemplary aspect, a hard-coded value that may work in the first system may not be appropriate for the second system. Therefore, in an exemplary aspect, the incorporation of a peak rate into one or more mechanisms discussed herein may provide a dynamic approach to rectifying a corrupt sequence number.

The peak rate may be communicated in combination with other information (e.g., as part of a header) or as a standalone communication from the primary to one or more nodes. In this example, the node B 606 receives the peak rate information and stores 610 the peak rate. In an exemplary aspect, the peak rate may be communicated in conjunction with a sequence number from a primary controller. In this example, the associated sequence number may provide an indication useful for determining a relative age (e.g., freshness) of a received peak rate. This may allow a receiving node to determine which peak rate is the newest. Further, it is contemplated that the peak rate may not only be communicated from a primary, but also from other nodes and components of the system. As will be discussed in greater detail at FIG. 12 hereinafter, exemplary aspects contemplate a decay of the peak rate rather than an abrupt decrease in the peak rate to prevent underestimating a result utilizing the peak rate (e.g., estimated sequence number, valid sequence number range).

Similar to the peak rate, the primary 602 communicates 612 a sequence number to one or more nodes, such as the node A 604 and the node B 606. The sequence number may be associated with a message being communicated from the primary 602 to the node A 604 that includes additional information and/or the sequence number may be communicated as a standalone communication, in exemplary aspects. Because a sequence number may be corrupted during communication, receipt, processing, or any other portion of communication, even a sequence number from a primary may be evaluated for falling within a valid sequence range, as will be discussed in greater detail with respect to FIG. 8 hereinafter.

The node A 604 updates 614 a stored real sequence number with the received sequence number. In an exemplary aspect, the received sequence number is only stored when the sequence number falls within the valid sequence number range. While the sequence number is discussed in particular with respect to the full value, it is contemplated that the full value is communicated, determined to be valid, stored, updated, and the like in any one or more of the steps, process, and the like discussed herein.

The node A 604 may then increase the propagation count associated with the sequence number. In an exemplary aspect, the propagation count is increased once the sequence number is being prepared to be communicated from the node A 604 to another node or controller. As will be discussed in greater detail hereinafter with respect to FIG. 11, the propagation count may not be incremented until the sequence number is to be communicated to account for the possibility that the sequence number became stale. Therefore, in an exemplary aspect, the propagation count is incremented once the sequence number is to be communicated. However, it is contemplated that the propagation count may be advanced at any point in an exemplary aspect.

The node A 604 may then communicate 618 the sequence number (or the full value including an epoch number and propagation count) to the node B 606 as part of an in-band communication. However, at some point the sequence number that is ultimately received by the node B 606 is a corrupt sequence number. As discussed previously, this may be a result of processing, communication, and/or receiving of the sequence number.

The node B 606 determines 620 the sequence number is corrupt. A determination of a sequence number being corrupt may be accomplished by determining a valid sequence number range based on a real sequence number at the node B 606, a peak rate, a time period elapsed since a time stamp associated with the real sequence number, a propagation count associated with the received sequence number, and/or a maximum time before a sequence number is stale. Using one or more portion of information including that discussed herein and other portions contemplated, a range may be identified that is anchored to the real sequence number and that provides a dynamic window of validity to which the received sequence number may be compared, as discussed hereinafter at FIG. 9.

Upon determining the sequence number is corrupt, the node B 606 may estimate 622 a sequence number. The estimated sequence number may be a sequence number that is intentionally higher than the current sequence number to force receiving nodes to communicate with a primary (as opposed to a secondary) until the sequence number of the system (as maintained by the primary) exceeds that of the estimated sequence number. Therefore, instead of hard coding a time period for which a node is to talk with the primary in hopes that the corrupted sequence number passes through the system, exemplary aspect instead rely on an intentionally high estimated sequence number to set a dynamic period in which the nodes speak to the primary. As a reminder, it is contemplated that if a secondary receives a request from a node and the request has a sequence number associated that is higher than the secondary, the request may be forwarded to the primary, which effectively forces the node to communicate with the primary until the sequence number of the secondary is equal to or greater than the estimated sequence number.

The estimated sequence number, while intentionally being high, is not too high so that the nodes effectively have to communicate with the primary for an exceptional length of time. Therefore, in an exemplary aspect, it is contemplated that the estimated sequence number is calculated at a level that allows for the actual sequence number to catch up to within a reasonable time (e.g., milliseconds, seconds, minutes, hours), such as five seconds. Once the current sequence number catches up with the estimated sequence number, it is contemplated that the secondary controllers may then take back over at least some of the request responsibilities to distribute the load.

In an exemplary aspect, the node having a corrupt sequence number does not merely reset the stored sequence number to that which is received from the primary. This is out of caution that a corrupt sequence number may ultimately be introduced along the communication from the primary to the node.

The node B 606 then communicates 624 the estimated sequence number with a propagation number set to a maximum predefined value to the node Z 608. Once a propagation value increments to the maximum predefined value (e.g., 15), a receiving node does not use that received sequence number as a trusted (e.g., real) sequence number. For example, the received sequence number having a maximum propagation count does not replace a stored real sequence number and therefore may not be used for calculating a future sequence validity range or a future estimated sequence number. Further, it is contemplated that a receiving node may not further propagate the estimated sequence number, but instead may estimate a new sequence number based, at least in part, on information particular to the receiving node (e.g., real sequence number stored at the receiving node).

In an exemplary aspect it is contemplated that a node will store both a real sequence number and an estimated sequence number. When the node then sends a communication including a sequence number, the node will use whichever of the stored real or the store estimated sequence numbers is greater in the communication. However, a received sequence number, regardless of being a "real" or an "estimated" sequence number is stored, in an exemplary aspect, if it is determined to be within a valid sequence number range and to be greater than the currently stored sequence number of its type (e.g., real or estimated).

In this example, if a node receives a sequence number that is determined to be invalid, the node may then calculate an estimated sequence number. The newly calculated estimated sequence number may then be stored at the node if the newly calculated estimate sequence number is greater than the currently stored estimated sequence number. In this example, the estimated sequence number is calculated based on a real sequence number, not from another estimated sequence number.

The incorporation of estimated sequence numbers is allows for the contemplation that eventually the node A 604 receives messages that include sequence numbers that are greater than the estimated sequence number and as a result begins updating the real sequence number in a manner similar to that previously discussed at 614, in an exemplary aspect of the present invention.

Figure 7:
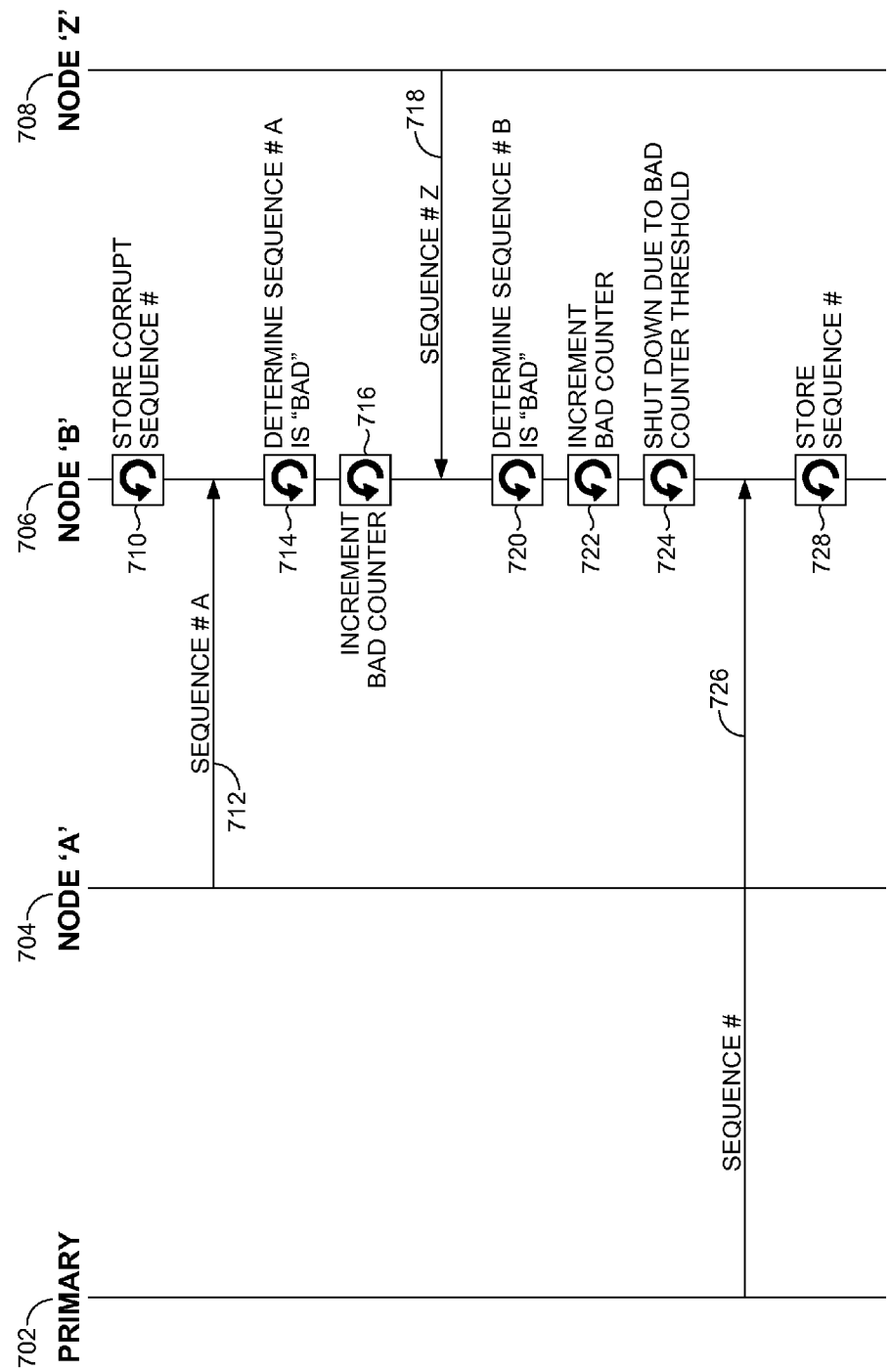
FIG. 7 depicts a communication diagram in an exemplary distributed computing environment for terminating a node maintaining a corrupt sequence number, in accordance with aspects of the present invention.

FIG. 7 depicts a communication diagram 700 in an exemplary distributed computing environment for terminating a node maintaining a corrupt sequence number, in accordance with aspects of the present invention. Another exemplary mechanism to rectify a corrupt sequence number in the distributed system includes preventing a node from continuously propagating a corrupt sequence number to other nodes. If the node maintaining the corrupt sequence number was allowed to perpetually distribute the corrupt sequence number, it is possible that other nodes in communication with the corrupted node would also be in a perpetual state of being force to communicate with the primary. Therefore, advantages of having secondary controllers available may not be fully realized in this situation. Consequently, allowing a node to determine that it may be a source of a corrupt sequence number and preventing the corrupt node from distributing the corrupt sequence number is contemplated in exemplary aspects of the present invention.

The distributed system is comprised of a primary 702, a node A 704, a node B 706, and a node Z 708. It is contemplated that more or fewer nodes, primaries, secondaries, and other components, roles, instances, devices, and the like may be implemented in exemplary aspects. In this example, the node B 706 is the node storing 710 a corrupt sequence number as a real sequence number. As a result, the node B 706 may be responsible for distributing a corrupt sequence number to other nodes. A mechanism for identifying that node B is storing a corrupt sequence number is provided.

The node A 704 communicates 712 a sequence number A to the node B 706. However, because the node B 706 maintains a corrupt sequence number, the sequence number A may appear as being invalid (e.g., bad). This determination may be the result of the sequence number A falling outside of a valid sequence range, which may be based at least in part on the corrupt sequence value. As a result, of the corrupt sequence number and the resulting sequence number validation range being out of alignment, non-corrupt (i.e., correct) sequence numbers appear as being corrupt to the node B 706.

The node B 706 may maintain a bad counter. The bad counter may function to increment by a predefined value (e.g., 1) each time a consecutive bad sequence number is received. Therefore, once the bad counter achieves a predefined bad counter threshold (e.g., 5, 10, 25, 100), the node may send a notification to a central monitoring service and/or disable one or more portions of functionality associated with the node.

After receiving what appears to be a corrupt (e.g., bad) sequence number from the node A 704, the node B 706 may determine 714 the sequence number is "bad." The determination that the sequence number is bad results in an incrementing 716 of the bad counter. However, it is contemplated that if a valid sequence number is determined as being received, then the bad counter may reset to an initial value (e.g., 0).

The node B 706 may receive 718 an additional sequence number, such as a sequence number Z from the node Z 708. The node B 706 may determine 720 that the sequence number Z is bad and then increment 722 the bad counter to reflect this consecutive bad finding. If the increment of the bad counter resulting from the sequence number Z exceeds the predefined bad counter threshold, then the node B may shut down 724. Shutting down may be the result of a determination that the bad counter had exceeded the predefined bad counter threshold. In an exemplary aspect, utilizing a bad counter that increments avoid complications associated with a hard-coded time. For example, a hard-coded time since receiving a last valid sequence number may not account for nodes that experience delays between received communications. However, merely utilizing a bad counter may also introduce problems, such as a premature shutdown of the node as a result of a burst of bad values. Therefore, it is contemplated that a combination of a bad counter in connection with a time variable (e.g., a predefined elapsed time since an initial bad value is received) may be used for determining when a node should be shut down.

In an exemplary embodiment, the node B 706 may restart in response to receiving 726 a sequence number from the primary 702. While corruption may be introduced by the primary, the communication of the sequence number, and/or the interpretation of the sequence number, the same bad counter incrementing may be utilized to identify if the newly trusted sequence number is valid. The received and potentially trusted sequence number may then be stored by the node B 706 for use in validation and/or estimation of sequence numbers.

As opposed to a mere binary-type (e.g., Boolean) decision as to if the received sequence value is good or bad based on being with a valid sequence number range, it is contemplated that multiple results may be determined with varying behaviors. For example, the determination as to if a sequence number is valid or not may actually result in one or more of the following results.

"Not Possible"—This determination may occur when a real value is unavailable for use in validating a received sequence number. This result may be interpreted as effectively indicating that the received sequence value is good (however invalidated), but there is logic lacking to handle the case in which a client has a stuck, bad, and/or high estimate. In this case, the node could send the bad estimate forever, since all other nodes could be generating estimates that are lower. If a node only has an estimate stored, and that estimate has not been updated for a predefined time period (e.g., 10 minutes), then a "Not Possible" result may be considered as a bad value.

"In Range"—This sequence value may be interpreted as a "good" sequence number that is within the valid sequence number range.

"Too High"—A sequence number that is determined to have this result is bad and looks too high to the receiving node. In this case, it can be determined that the sending node has a higher value than the node that received it. As such, the receiving node may then determine it does not have the highest value in the system. So either the sending node is bad, or the receiving node is stuck with too low of a value. To deal with the latter case, if the node has not updated the stored real sequence for a predetermined time period (e.g., 10 minutes), a "Too High" result is considered as a bad value.

"Too Low"—The received sequence number may be determined to have this result when the value is bad and looks too low to the receiving node. Unlike the "Too High case," the "Too Low" result may indicate that the receiving node has a high value (the sending node appears low). The received sequence number could be the highest in the system, and wrong. As such, a sequence number determined to have a result of "Too Low" may be counted as a bad value.

"Bad Epoch"—As discussed hereinafter, a sequence number may be accompanied by an epoch number. The "Bad Epoch" result may be determined when received value has a bad epoch number. This may be expected during an epoch transition, but it should go away once the new epoch has propagated through the system. As long as the real sequence value is being updated, this may not be counted as an error. If the node has not updated a stored real sequence number for a predefined period of time (e.g., 10 minutes), a value determined to be a "Bad Epoch" is counted as a bad value.

In all of these various types of results, the actions that occur in response may vary with a bad value. Each node may keep track of an identifier (ID) of the remote (e.g., sending) node that sent the last good and the last bad value. A bad count may only be updated if the ID of the node that sent the value is different from the node that sends the last value (of each type, good and bad). So if one node keeps sending bad values, error count may be incremented once. Similarly, if one node keeps sending good values, the bad count may only decrement the error count once. If the error count gets too high (e.g., 30) and the errors started a while ago (e.g., at least 30 seconds), the node may shut itself down (e.g., terminates one or more processes).

In an exemplary aspect, this logic provides that if one node has a bad sequence value, all sequence values it receives from all nodes will look bad, so it will shut down. All of the other nodes have good sequence values, so they will only receive bad sequence values from one bad node and will not shutdown. Therefore, exemplary aspects may not incorporate a consecutive bad count by incorporating decrementing count logic.

Figure 8:
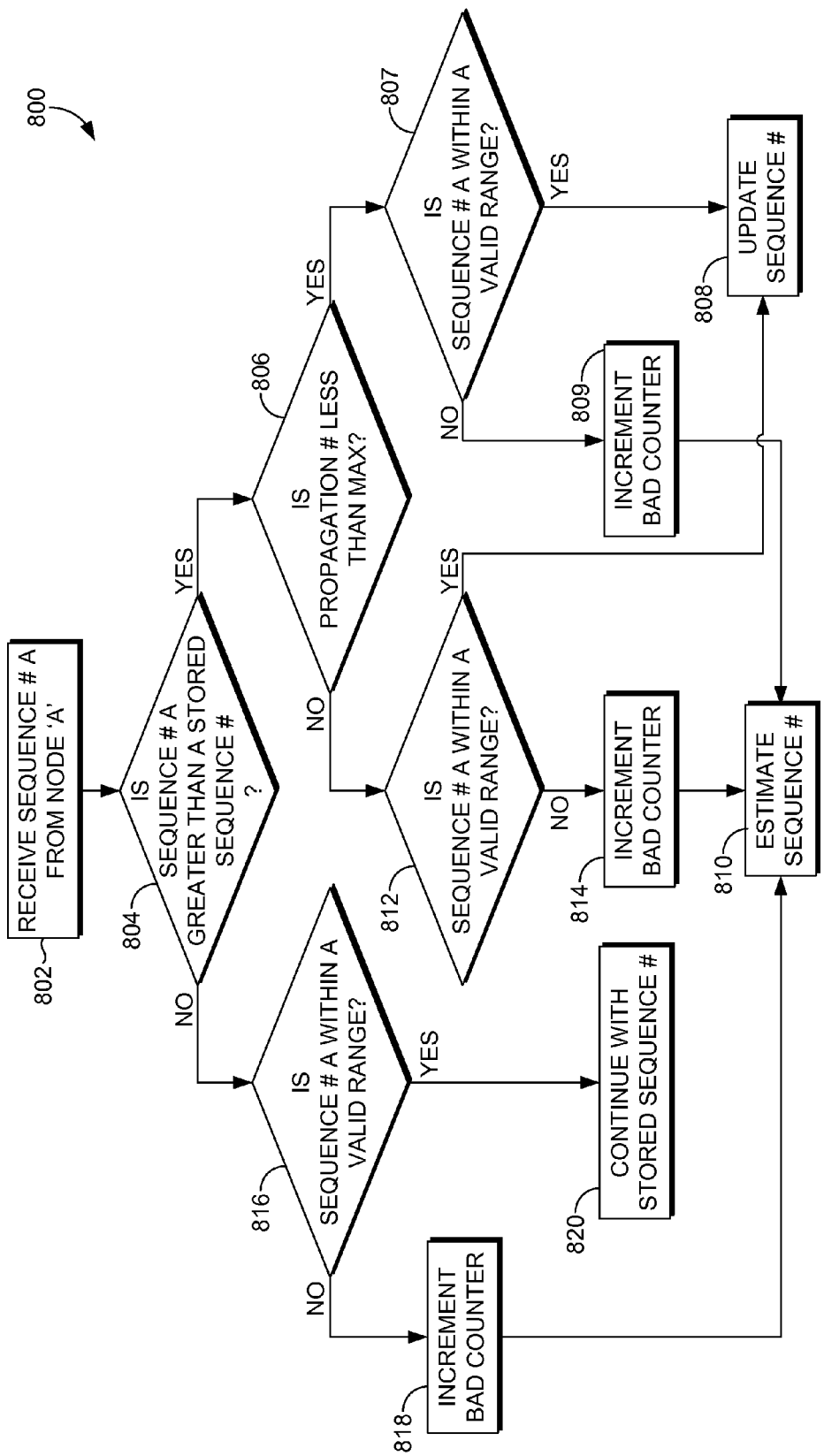
FIG. 8 depicts a block diagram illustrating a method for validating a sequence number in a distributed computing environment, in accordance with aspects of the present invention.
Figure 9:
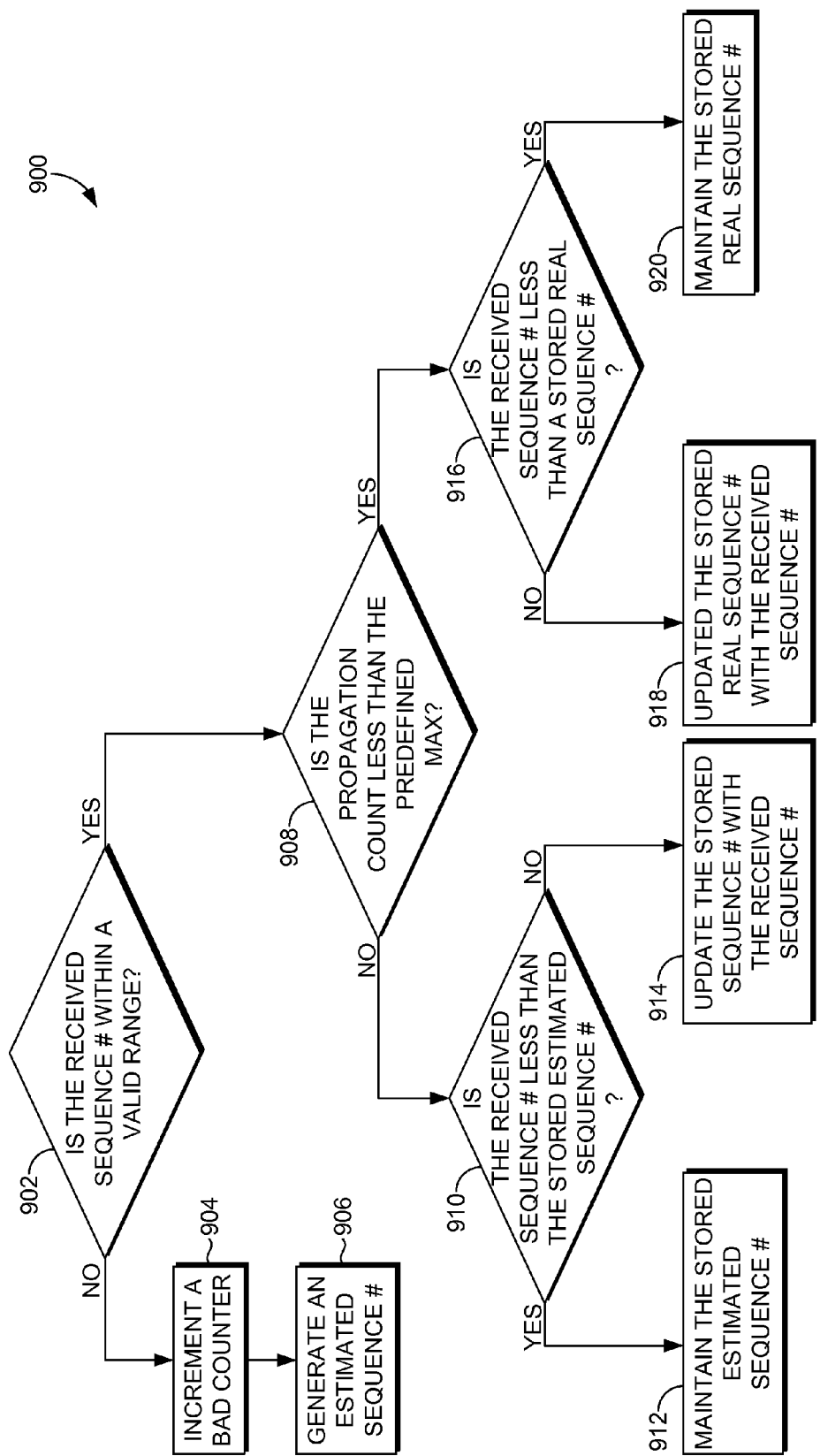
FIG. 9 depicts a block diagram illustrating another method for validating a sequence number in a distributed computing environment, in accordance with aspects of the present invention.

FIG. 8 depicts a block diagram illustrating a method 800 for validating a sequence number in a distributed computing environment, in accordance with aspects of the present invention. Both FIGS. 8 and 9 depict various examples of contemplated methods for identifying and rectifying a corrupt sequence number. Therefore, it is contemplated that any combination and/or order of steps may be implemented to accomplish the desired results provided herein.

At a block 802 a sequence number A is received from a Node A. In an exemplary aspect the sequence number A is received by a node B through an inter-system message that includes, among other information, the sequence number A, and epoch number, and a propagation count.

At a block 804 a determination is made if the sequence number A is greater than a stored sequence number (e.g., trusted sequence number). A trusted sequence number is one that meets conditions allowing the node B to utilize the trusted sequence number in the calculation of a sequence number validity range and an estimated sequence number, in an exemplary aspect.

If at block 804 the determination is that the sequence number A is greater than the stored sequence number, the method transitions to a block 806. At block 806 a determination is made if an associated propagation number with the sequence number A is less than a predefined propagation count maximum. As previously discussed, a received sequence number that is associated with a maximum propagation count may not be elevated to a trusted sequence number level out of caution that the received sequence number is either stale or an estimated sequence number.

If at block 806 the propagation number is determined to be equal to (or greater) than the propagation maximum (indicating that the received sequence number is not stale and is not an estimated sequence number), the method progresses to a block 807. At the block 807 a determination is made if the received sequence number A is within a valid sequence number range. A valid sequence number range will be discussed hereinafter with respect to FIG. 10. If a determination is made that the sequence number A is within a valid sequence number range, the stored sequence number (e.g., trusted sequence number) is updated at the node B to reflect the sequence number A, as indicated at a block 808. Therefore, future sequence number estimations and future sequence number validity ranges may be based, at least in part, on the sequence number A.

If, however, the method at the block 807 determines the sequence number A is outside of a valid sequence range, the trusted sequence number is not updated with the sequence number A and future messages may include an estimated sequence number, as indicated at a block 810, as will be discussed hereinafter. In addition to calculating an estimated sequence number, a bad counter at the node may be incremented to indicate that a corrupt sequence number is suspected, as indicated at a block 809. As previously discussed, the bad counter facilitates a mechanism for the node to determine if it is relying on a trusted sequence number that is actually corrupt, and therefore may require terminating, at least temporarily, use of the node.

The estimated sequence number may be calculated, in an exemplary aspect by taking a local time reading from node B's clock less the time indicated on a time stamp associated with the trusted sequence number, which provides an estimation of elapsed time since a last trusted sequence number was received. The elapsed time may then be added to the propagation count of the trusted sequence number multiplied by a propagation maximum propagation threshold time (e.g., time in which the sequence number can remain on a node before being considered stale). Additionally, it is contemplated that this result may then also be added to network delay variables and other variables representing friction in the process. The totality of this summation is then multiplied by a peak rate for the primary. The resulting value may represent a sequence number that is estimated at a high level, but yet plausible in an ideal scenario (e.g., the primary processes at the peak rate and all of the nodes hold on to the sequence number for the maximum threshold time without exceeding). Stated differently, the calculation of the estimated sequence number may be represented as follows: Estimated sequence number= (((Node internal clock time−internal clock time indicated in times stamp of trusted sequence number)+(propagation count of trusted sequence number*propagation count threshold time)+(other friction variables [such as network latency])) *Peak rate of the primary as maintained by the Node) and trusted sequence number. As used herein, it is contemplated that no clock or timestamps are based from or shared with other nodes in an exemplary aspect. However, it is contemplated that the only concept of a clock functionality that is shared among nodes is the sequence number itself.

It is understood that the previously provided method for calculating an estimated sequence number is exemplary in nature and one or more variables may be removed or inserted into the equation. For example, the other friction variables may be removed entirely in an exemplary aspect. Further, while specific location of accessing the information is provided (e.g., node), it is contemplated that information may be stored or originate from alternative components and locations.

Further, when an estimated sequence number is calculated, an associated propagation count may be set to the maximum threshold value prior to communicating to another component. As a result, the receiving component, in an exemplary aspect, will not utilize the estimated sequence number as a trusted sequence number. The use of the propagation count may prevent having to include an additional indicator or tag to identify the estimated sequence number as a sequence number not to be trusted.

Returning to FIG. 8, if at the block 806 the propagation number for sequence number A is found to be equal (or greater than) the maximum propagation count, the method proceeds to a block 812. At the block 812, a determination is made if the sequence number is within a valid sequence number range. If the determination is that the sequence number A is not within a valid sequence number range, a bad counter may be incremented, as indicated at a block 814.

If, however, the determination at the block 812 is that the sequence number is within a valid sequence number range and the received sequence number is an estimated sequence number, the received sequence number may then be compared to the highest stored estimated sequence number and replace the stored estimated sequence number if the received sequence number is higher, as indicated at the block 808.

Returning to the top decision of the method 800, if at the block 804 the determination is that the sequence number A is not greater than the stored (e.g., trusted) sequence number, the method proceeds to a block 816. At the block 816 a determination is made if the sequence number A is within a valid range. If the determination is that it is not, then the bad counter may be incremented, as indicated at a block 818. The method may then proceed to the block 810 for the estimation of a sequence number.

However, if at block 816 the determination is that the sequence number A is within the valid range, the node B may continue using the stored sequence number, as indicated at a block 820. In an exemplary aspect, a node will use the highest real sequence number received that is within the valid sequence range. Because a determination was made at the block 804 that the sequence number A is less than the stored sequence number (a sequence number previously seen by the node B), the stored sequence number is used by the node, in this example.

Determinations discussed herein are contemplated as being performed by a processor using memory to come to one or more results. For example, based on information provided, the processor and memory may determine if a criterion is satisfied. Therefore, any one or more of the determination may be implemented by a machine resulting in a transformation that produces a tangible result, such as the creation of an estimated sequence number, the incrementing of a bad counter, and/or the updating of a sequence number stored in a media.

FIG. 9 depicts a block diagram illustrating another method 900 for validating a sequence number in a distributed computing environment, in accordance with aspects of the present invention. The method 900 varies in order and events to that which was discussed with respect to FIG. 8 hereinabove; however, it is understood that the method 900 may be utilized in place of or in addition to any other method described herein.

At a block 902, an initial determination may be performed to determine if a received sequence number is within a valid sequence number range. Examples for determining if a sequence number is within a valid range are provided for herein. If a determination is made at the block 902 that the received sequence number (which may be received from another node) is not within a valid sequence number range, the method may advance to a block 904 at which point a bad counter is incremented. The incrementing of a bad counter may include advancing the bad counter by a value of one.

The method 900 may then proceed to a block 906 for the generation of an estimated sequence number. The calculation of an estimated sequence number may take a number of factors into consideration, such as a stored real sequence number, a peak rate stored at the node representing a primary controller, and other factors.

Returning to the block 902, if the determination is that the received sequence number is within a valid range, the method may advance to a block 908 for a determination if an associated propagation count is less than a predefined maximum. As previously discussed, a received sequence number may be associated with a propagation count that may increment for each time it is communicated. A predefined maximum value may be used system-wide (or at one or more particular components, node, controllers) for the propagation maximum.

If, at the block 908, the determination is that the propagation count is not less (i.e., more) than the predefined maximum, the method may advance to a block 910. At the block 910, a determination is made if the received sequence number is less than a stored estimated sequence number. As previously discussed, a node may store the highest estimated sequence number and the highest real number. In the determination at the block 910, the received sequence number is compared to the stored estimated sequence number. This may be in part a result that estimated sequence numbers may have a related propagation count set to a predefined value (e.g., the propagation count max) as an indicator that it is an estimated sequence number.

If, at the block 910, it is determined that the received sequence number is less than the stored sequence number, the method may advance to a block 912 such that the currently stored estimated sequence number is maintained because it is larger than the received sequence number.

If, however, the determination is that the sequence number is greater (i.e., not less) than the stored sequence number, the method 900 may advance from the block 910 to a block 914. At the block 914, the method 900 may include updating at the node the stored estimated sequence number with the received sequence number. In this example, the node may now maintain the highest estimated sequence number.

Returning to the block 908, if the determination is that the propagation count for the received sequence number is less than the predefined maximum, the method 900 may advance to a block 916. At the block 916 a determination is made if the received sequence number is less than a stored real sequence number. As previously discussed, a real sequence number is a sequence number that is within a valid sequence number range and that was received with a propagation count less than the predefined maximum. If the received sequence number is determined to be less than the stored real sequence number, the method 900 may advance to a block 920 indicating that the stored real sequence number is maintained without being replaced by the received sequence number.

If, at the block 916, the determination is that the received sequence number is not less (i.e., more) than the stored real sequence number, the method 900 may advance to a block 918. At a block 918, the stored real sequence number is updated to reflect the value of the received sequence number. This update may be used to enforce a rule that the largest (i.e., highest) received valid sequence number not having a maximum propagation count at the time of recipient is the stored real sequence number at a node. The stored real sequence number may therefore be used in the calculation of a future estimated sequence number and/or the calculation of a valid sequence number range.

As can be appreciated, the various determinations may be arranged in a variety of manners and sequences to detect and rectify a potentially corrupt sequence number. Such alternative arrangements and sequences are contemplated herein.

Figure 10:
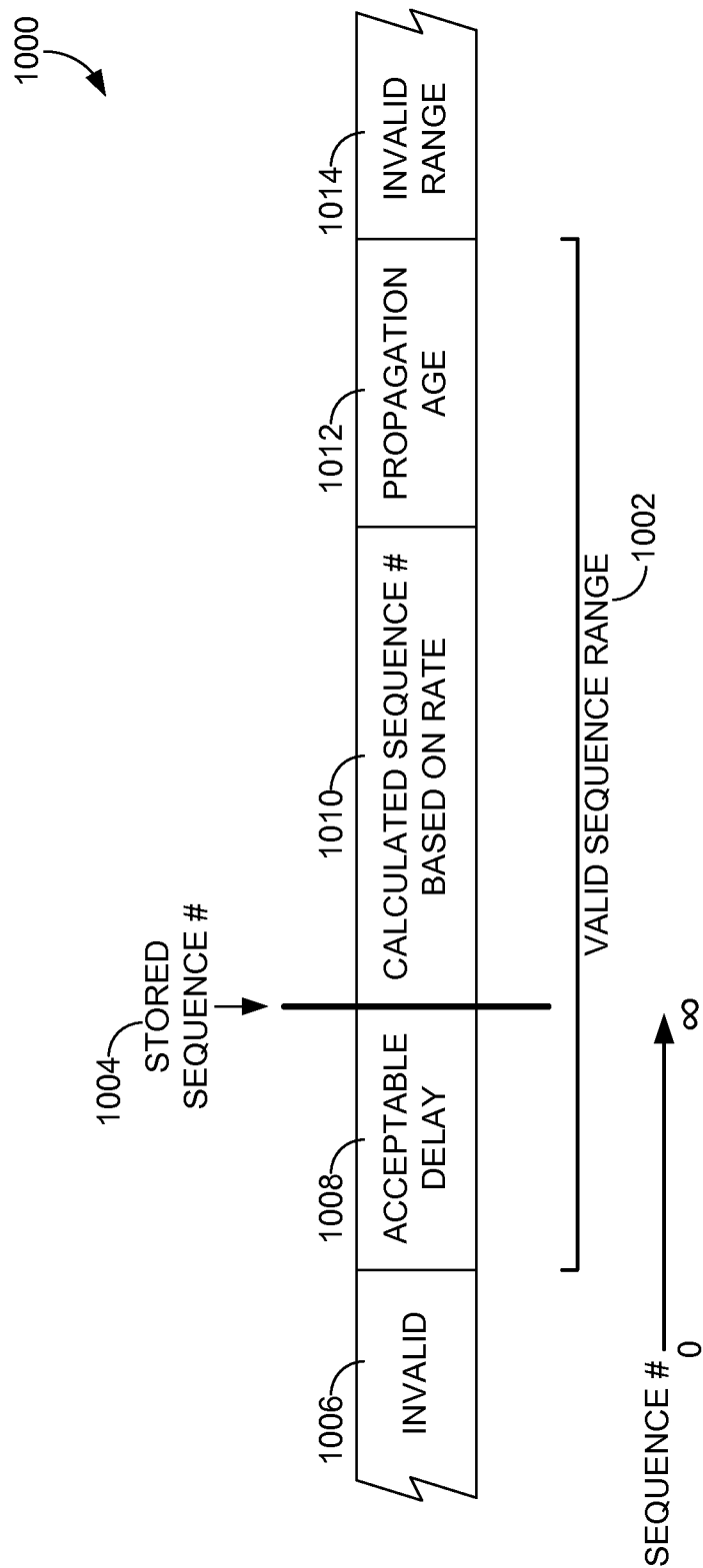
FIG. 10 depicts a moving sequence number validity range, in accordance with aspects of the present invention.

FIG. 10 depicts a moving sequence number validity range 1000, in accordance with aspects of the present invention. Moving from left to right the sequence numbers would increase. Within this increasing range of sequence numbers, a valid sequence range 1002 is identified. The valid sequence range 1002 is comprised of an acceptable delay portion 1008, a calculated sequence number based on peak rate 1010, and a propagation age portion 1012. Portions not included in the valid sequence range 1002 include an invalid portion 1006 having smaller sequence values and an invalid range 1014 having greater sequence numbers than the valid sequence range 1002.

An anchor point in the valid sequence range 1002 from which the range is based is a stored sequence number, which may be referred to as a trusted sequence number herein. Taking in to account acceptable delays based on network latency and other friction inducing functions, the acceptable delay portion 1008 allows for received sequence number to still be considered valid even when they are received as having a smaller sequence number than the stored sequence number because of the acceptable delay portion 1008. The acceptable delay portion 1008 may be a hard-coded value (e.g., 5, 50, 500, and 5,000) or it may be based on the peak rate multiplied by a constant or a variable.

The valid sequence range 1002 that is greater than the stored sequence number 1004 may include the calculated sequence number based on the peak rate. As previously discussed, the peak rate stored by the node reflecting the peak rate of the primary (or a decaying representation as will be discussed hereinafter at FIG. 13) may be multiplied by a time that has elapsed since the stored sequence number was received (or at least indicated as being received). For example, a time stamp may be associated with the stored sequence number such that the time stamp is based on an internal clock of the node. Identifying the difference in the current time and the time stamp provides an indication as to what a sequence number could be when multiplied by the peak rate. To further account for propagation age (e.g., time in which the sequence number is held by each of the nodes before being passed along) the propagation count may be multiplied by the propagation threshold time (e.g., the maximum time a node is allowed to hold a sequence number before having to indicate the sequence number is stale). This results in the propagation age portion 1012. It is further considered that another portion may be used to expand the valid sequence range 1002, such as a calculation of friction induced variables (e.g., network latency) or the inclusion of a hard-coded buffer value.

Figure 11:
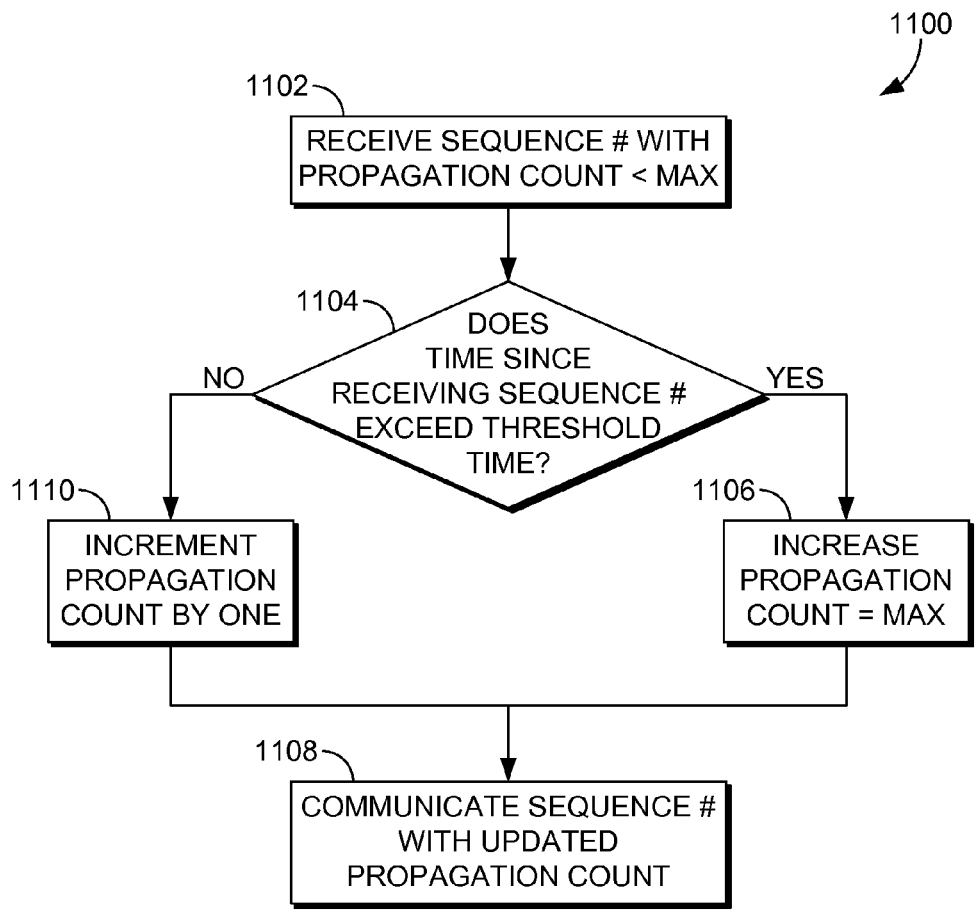
FIG. 11 depicts a block diagram representing a method for updating a propagation count associated with a sequence number, in accordance with aspects of the present invention.

FIG. 11 depicts a block diagram representing a method 1100 for updating a propagation count associated with a sequence number, in accordance with aspects of the present invention. At a block 1102 a sequence number is received by a node. The sequence number has a propagation count associated with it that is less than a maximum propagation count threshold. The method proceeds to a block 1104 where a determination is made if a period of elapsed time between receiving the sequence number (as may be indicated by a time stamp associated with the sequence number) and the current time exceed a propagation count time threshold. For example, a sequence number may only be "current" (not stale) for 110 milliseconds; however, other times are contemplated.

If, at the block 1104, the determination is that the sequence number is stale (as a result of being held by the node for longer than the propagation count time threshold), the method proceeds to a block 1106. At the block 1106 the propagation count associated with the sequence number may be advanced to the maximum propagation count value (e.g., 15). As a result, a receiving node of the sequence number will not, in an exemplary aspect, use the received sequence number as a trusted sequence number.

In the alternative, if at the block 1104 the determination results in the threshold time not being exceeded, the method proceeds to a block 1110. At the block 1110 the propagation count is incremented by one (or any number). Therefore, if the sequence number was associated with a propagation count of 5 prior to communicating to additional nodes, the propagation count may be advanced to 6.

The method advances from both the blocks 1106 and 1110 to a block 1108. At the block 1108, the sequence number is communicated with an updated propagation count, which may be incremented or set to the maximum threshold value.

Figure 12:
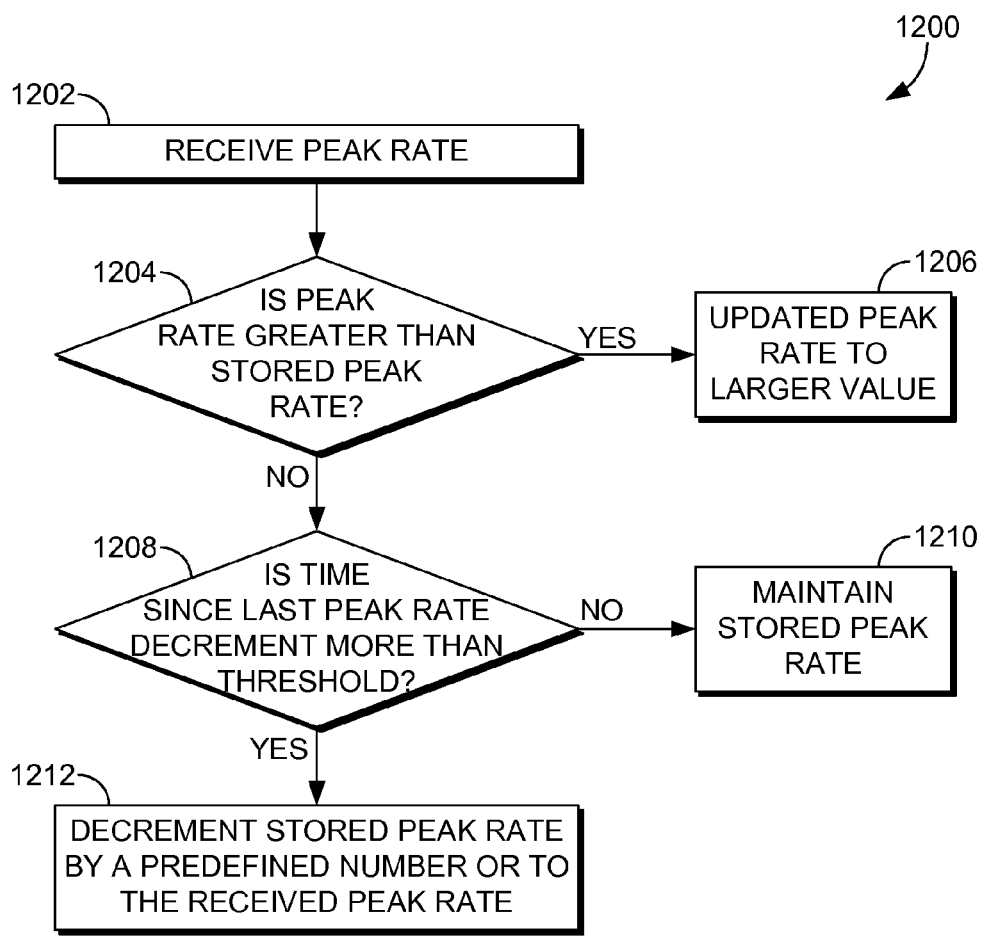
FIG. 12 depicts a block diagram illustrating a method for adjusting a peak rate at a node based on a peak rate received from a primary controller, in accordance with aspects of the present invention.

FIG. 12 depicts a block diagram illustrating a method 1200 for adjusting a peak rate at a node based on a peak rate received from a primary controller (or any other node in an exemplary aspect), in accordance with aspects of the present invention. At a block 1202 a peak rate is received. In an exemplary aspect the peak rate is received at a node from a primary controller in connection with a sequence number. For example, a received peak rate may be limited to being used, in an exemplary aspect, to those instances where a stored real or estimated sequence number is updated at the node with the sequence number received in connection with the peak rate. In this example, the received sequence number may serve as a timestamp for the peak rate to ensure a future received peak rate is a newer value. The peak rate may represent the peak number of sequence number advances in a defined period of time.

The method advances to a block 1204 where a determination is made if the received peak rate is greater than a stored peak rate. If it is greater, the method proceeds to a block 1206 where the peak rate is updated at the node to reflect the received peak rate. However, if the determination is that he received peak rate is not greater than the stored peak rate, the method proceeds to a block 1208.

At the block 1208 a determination is made if a period of time has elapsed since a previous peak rate decrease occurred at the node. For example, as will be highlighted below, while aspects of the invention allow the peak rate to always increase, the peak rate is throttled in its ability to decrease. Therefore, instead of merely updating the peak rate to reflect a received lower peak rate, the peak rate is gradually lowered based on a decay approach. This may allow for the estimated sequence number and the sequence number valid range, which both may take into account the peak rate, to traditionally result in a high enough value to fulfill functions for which they are intended. If the time since the last decrement occurred does not exceed a threshold, the process advances to a block 1210 in which the current peak rate is maintained.

If, however, the elapsed time since the last decrement exceeds the time threshold, the stored peak rate is decremented by a predefined number (e.g., 1) or to the received peak rate (in the case where the decrement value would exceed the received peek rate value). This process allows for a gradual decay in peak rate.

Figure 13:
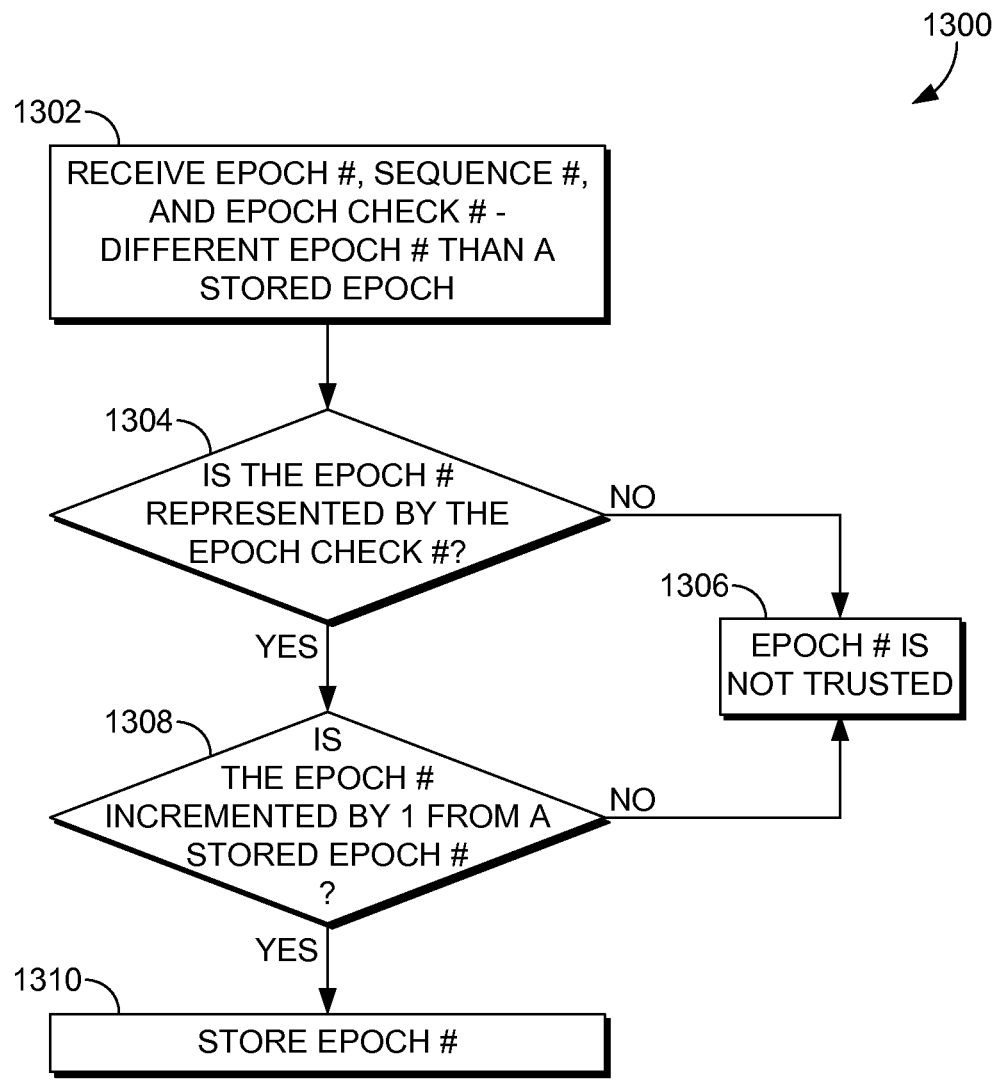
FIG. 13 depicts a block diagram illustrating a method for accounting for an epoch number change associated with a sequence number, in accordance with aspects of the present invention.

FIG. 13 depicts a block diagram illustrating a method 1300 for accounting for an epoch number change associated with a sequence number, in accordance with aspects of the present invention. At a block 1302, an epoch number, sequence number, and an epoch check number is received that is different from an epoch stored at the node. Because the epoch is different, it is likely that the sequence number received is also less than the stored sequence value at the node. In an exemplary aspect, it is likely that the sequence number is outside of the valid sequence range as a result of the new epoch number (this is in part because the sequence number resets to an initial value with a new epoch number, in some embodiments).

The method advances to a block 1304 where a validation is performed to determine if the received epoch number is also represented by the epoch check number. The epoch check number may be a hash value or other representation of the epoch number to validate the intention of the received epoch number. For example, if the epoch number is corrupted during communication, it is unlikely that the epoch check number is also corrupted in a manner that they corrupted epoch number and the corrupted epoch check number represent a common value. Therefore, the epoch check number serves as a validation value for the epoch number. If the determination is that the epoch number and the epoch check number are not in agreement, the method proceeds to a block 1306 in which the received epoch number is not trusted.

If, however, the determination at the block 1304 is that the epoch number and the epoch check number do agree, a determination made if the received epoch number only increased by one from the stored epoch number, as indicated at a block 1308. In an exemplary aspect, because epoch number advances are rare in occurrence, it is unlikely that the epoch number would update more than once from the epoch number stored on at the node. Therefore, if the epoch number does advance more than one, an error may have occurred in the system and the method advances to the block 1306. If the epoch number is determined to only advance by one, the epoch number is stored at the node, as indicated at a block 1310.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method in a distributed computing environment utilizing a processor and memory for detecting and rectifying corrupt sequence numbering in a distributed clock system of the distributed computing environment, the method comprising:
receiving, at a first node within the distributed computing environment, a first sequence number from a second node;
receiving, from a primary controller in the distributed computing environment, a peak rate of sequence number incrementing by the primary controller;
determining, with the processor, the first sequence number is greater than a stored sequence number;
determining a propagation number associated with the first sequence number is less than a predefined maximum propagation number;
determining the first sequence number is within a valid sequence number range, and
updating the stored sequence number to represent the first sequence number.

2. The method of claim 1, wherein the valid sequence number range is calculated, in part, based on the peak rate.

3. The method of claim 2 wherein the valid sequence number range is calculated, in part, based on the peak rate of the primary controller and a time elapsed since receiving the stored sequence number.

4. The method of claim 3, wherein the valid sequence number range is also calculated, in part, based on the propagation number associated with the first sequence number.

5. The method of claim 1 further comprising determining an elapsed time from a time stamp associated with the first sequence number is greater than a threshold time period.

6. The method of claim 5 further comprising increasing the propagation number associated with the first sequence number to the predefined maximum propagation number.

7. The method of claim 1 further comprising determining an elapsed amount of time from a time stamp associated with the first sequence number is less than a threshold time period.

8. The method of claim 7 further comprising increasing the propagation number associated with the first sequence number by one.

9. The method of claim 1 further comprising:
receiving an epoch number associated with the first sequence number and an epoch check number; and
determining the epoch number is different from a second epoch number associated with the stored sequence number.

10. The method of claim 9 further comprising:
determining the epoch number is not represented by the epoch check number; and
identifying the epoch number as a corrupted epoch number.

11. The method of claim 9 further comprising:
determining the epoch number is represented by the epoch check number; and
determining that the epoch number is incremented by one from the second epoch number associated with the stored sequence number.

12. One or more computer storage media, embodied within a hardware device, having computer-executable instructions embodied thereon, that when executed by a computing system having a processor and memory, cause the computing system to perform a method for rectifying corrupt sequence numbering in a distributed clock system of a distributed computing environment, the method comprising:
receiving, at a first node within the distributed computing environment, a first sequence number from a second node;
receiving a peak rate of a primary controller;
determining, with the processor, the first sequence number is not within a valid sequence number range; and
estimating, based in part on the peak rate, a sequence number, wherein the estimated sequence number is greater a stored sequence number.

13. The media of claim 12, wherein the method further comprises determining, with the processor, the estimated sequence number is greater than a stored sequence number.

14. The media of claim 12, wherein the method further comprises incrementing a bad counter associated with the first node in response to identifying the first sequence is not within the valid sequence range.

15. The media of claim 14, wherein the method further comprises suspending the first node in response to the bad counter achieving a predefined bad counter threshold.

16. The media of claim 12, wherein the method further comprises:
- determining a second sequence number is within a valid sequence number range;
- determining the second sequence number is less than a stored sequence number; and
- decrementing a bad counter by a predefined value.

17. The media of claim 12, wherein the estimating the sequence number is comprised of:
- increasing the stored sequence number based on an elapsed time multiplied by the peak rate.

18. The media of claim 12, wherein the estimating the sequence number is further comprised of:
- increasing the sequence number based on the propagation number multiplied by a maximum propagation number threshold time.

19. The media of claim 12, wherein the method further comprises:
- determining the peak rate is less than a stored peak rate; and
- decrementing the stored peak rate by a predefined number.

20. A system for rectifying corrupt sequence numbering in a distributed clock system of a distributed computing environment, the system comprising:
- a primary controller of the distributed clock system, wherein a communication from the primary controller to one or more nodes of the distributed computing environment include a sequence number, an epoch number, a peak rate, and an epoch number check;
- a first node, wherein communications from the first node include a first sequence number; and
- a second node of the distributed computing environment, wherein communications from the second node include a second sequence number, wherein the second sequence number is an estimated sequence number calculated, in part, based on the peak rate from the primary controller.

* * * * *